Patented Mar. 25, 1941

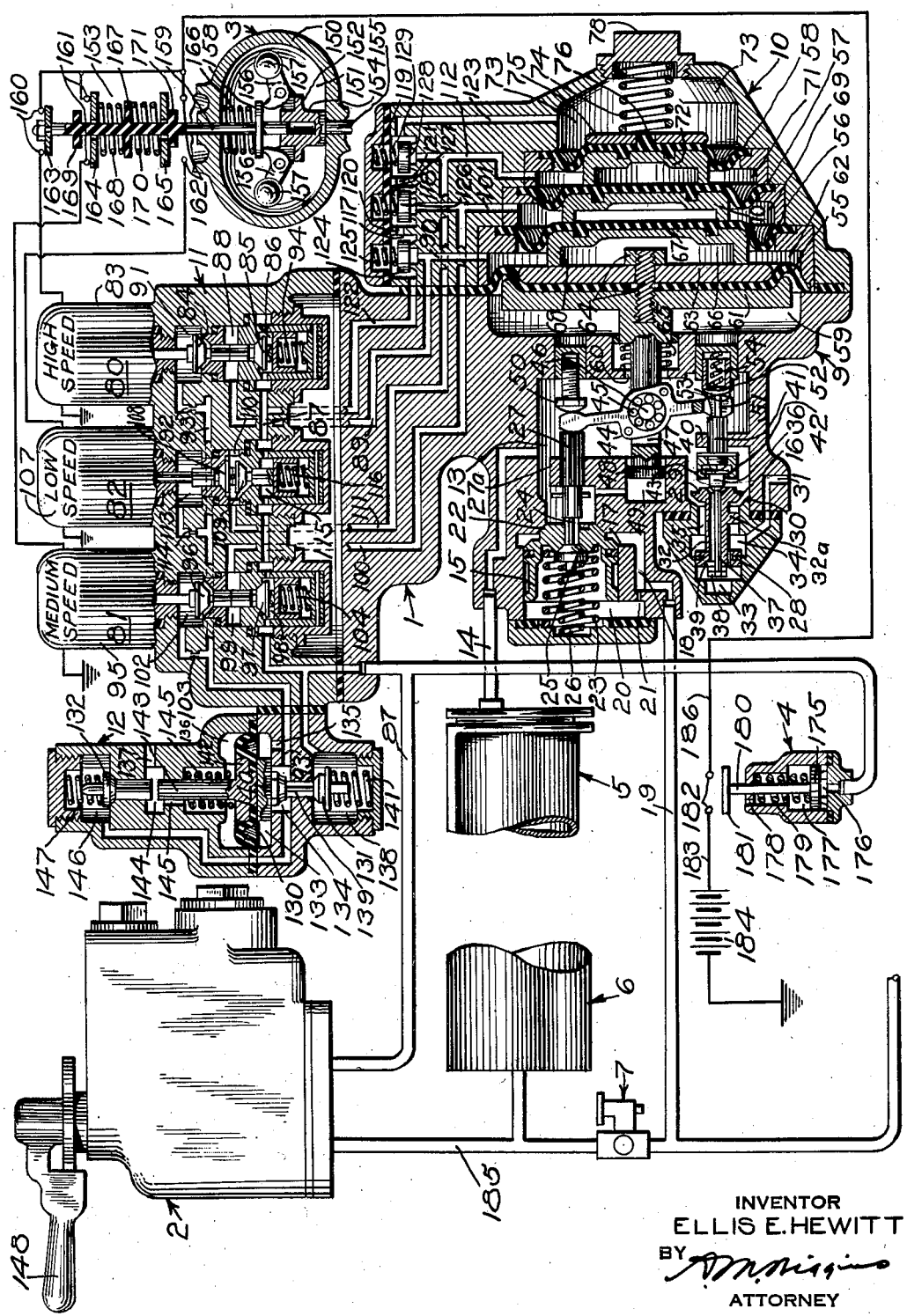

2,236,268

UNITED STATES PATENT OFFICE 2,236,268

FLUID PRESSURE BRAKE MEANS

Ellis E. Hewitt, Edgewood, Pa., assignor to The Westinghouse Air Brake Company, Wilmerding, Pa., a corporation of Pennsylvania Application November 30, 1939, Serial No. 306,893

17 Claims. (Cl. 303—21)

This invention relates to fluid pressure brakes for railway vehicles and more particularly to the type in which the degree with which the brakes on the vehicle or vehicles of a train are applied is varied in accordance with the speed or rate at which the vehicle or train is traveling.

In Patent No. 2,140,624, issued to me on December 20, 1938, there is disclosed a fluid pressure brake equipment of the above type which embodies a speed governor device and a relay valve device. The relay valve device is provided for controlling the application and release of brakes on a vehicle and is so constructed and arranged for control by said speed governor device as to operate to limit the degree with which the brakes on the vehicle are applied in accordance with the speed at which the vehicle is operating. By thus limiting the degree with which the brakes can be applied on the vehicle, slipping or sliding of the vehicle wheels is greatly minimized at all times.

The principal object of the present invention is to provide a fluid pressure brake equipment embodying an improved speed controlled relay valve device of the above general type.

Other objects and advantages will be apparent from the following more detailed description of the invention.

Description of parts

In the accompanying drawing, the single figure is a diagrammatic view, namely in section, of a fluid pressure brake equipment embodying the invention.

As shown in the drawing, the fluid pressure brake equipment comprises a brake application control or relay valve device 1, a brake valve device 2, a speed governor or speed responsive switch device 3, a switch device 4, a brake cylinder device 5, a main reservoir 6 and a feed valve device 7.

The brake application control or relay valve device 1 comprises a brake application and release valve device 9, a diaphragm portion 10 associated with said device for controlling the operation thereof, an associated magnet valve device portion 11 for controlling the operation of said diaphragm portion, and an inshot valve device or pressure limiting device 12 associated with the magnet valve device portion 11.

The application and release valve device 9 comprises a casing having a chamber 13 which is connected to a secondary control pipe 14 leading, in the present embodiment of the invention, to the brake cylinder device 5. In the casing there is provided a brake application valve 15 for controlling a supply of fluid under pressure to chamber 13 and thereby to the brake cylinder device 5, and a brake release valve 16 for releasing fluid under pressure from said chamber and thereby from the brake cylinder device 5 to the atmosphere.

The application valve 15 is preferably of the valve piston type having at one side a chamber 17 which is connected through a passage 18 to a pipe 19 leading to the delivery side of the feed valve device 7; the other side of said feed valve device being connected to a pipe 185 leading to the main reservoir 6 and through which said reservoir is also connected to the brake valve device 2. At the opposite side of valve piston 15 there is provided a chamber 20 which is connected through a port 21, having a relatively restricted flow area, to the passage 18. In the casing there is provided a valve seat 22 adapted to be engaged by the application valve 15 for closing communication between chambers 17 and 13. In chamber 20 there is provided a relatively light bias spring 23 acting on the application valve 15 for normally urging it into engagement with the valve seat 22.

The application valve 15 is provided with an axial bore for connecting chamber 20 to chamber 13 and slidably mounted in this bore is the fluted stem 24 of a pilot valve 25 which is disposed in chamber 20 and adapted to engage or seat against the application valve for closing communication from said chamber to the chamber 13. A light bias spring 26 is provided in chamber 20 within the spring 23 and acts on the pilot valve 25 for normally urging it to its closed position.

In the casing there is provided an outstanding shelf 27a having a bore in coaxial alignment with the pilot valve stem 24, and slidably mounted in this bore is an operating pin 27. The end of this pin adjacent the pilot valve stem 24 is adapted upon movement in one direction in the casing to successively operate or unseat first the pilot valve 25 and then engage and unseat the application valve 15. The application valve 15 is provided with a slot in its seating face to prevent closing communication past the pilot valve stem 24 to chamber 13 when pin 27 is in engagement with said valve.

The release valve 16 is disposed in the casing at one side of the application valve 15 with its axis parallel to that of said application valve. The release valve 16 comprises a piston 28, a valve 29 adapted to engage a seat 30 formed in the casing for closing communication between chamber 13 and an atmospheric release port 31, and a stem 32 connecting said piston and valve together.

The release valve piston 28 is slidably mounted in a suitable bore in the casing and has at one side a chamber 33 and at the opposite side a chamber 34 which is open to the atmospheric vent passage 31. The valve 28 is contained in the chamber 13 and a bore 35 is provided connecting chamber 34 to the seat 30 for said valve. The valve stem 32 extends through the bore 35 and is provided with one or more suitable guides 32a engaging the side wall of said bore for supporting the release valve 28 in operating alignment with its seat 30 and past which guides communication is adapted to be established between chambers 13 and 34 when the release valve 28 is unseated.

The release valve 16 is provided with an axial bore connecting chamber 13 to chamber 33. In chamber 13 there is provided a pilot valve 36 for the release valve 16 and said pilot valve has a stem 37 loosely extending through the bore in the release valve and into chamber 33 wherein a nut 38 is provided on the end of the stem. The nut 38 is of greater diameter than the bore through the release valve so as to engage the outer face of the piston 28, a slot 39 being provided in said face for maintaining communication between the chamber 33 and the bore in the release valve under such conditions.

The casing is provided with a shelf 40 extending into chamber 13 and in this shelf there is provided a bore in coaxial alignment with the release valve 16. An operating pin 41 is slidably mounted in this bore and is provided on its left hand end with an annular rib 42 encircling the pilot valve 36 and adapted to engage a like rib 43 on said valve for unseating said valve upon movement of said pin in the direction of the right hand.

Operation of the application valve 15 and release valve 16 and of the pilot valves 25 and 36, respectively, is adapted to be controlled by a floating lever 44 provided in chamber 13. This lever is pivoted intermediate its ends by a bearing 45, shown as of a ball-bearing type, on a pin 46 which is carried by a plunger 47. The plunger has on one end a piston-like guide 48 which is slidably mounted in a bore 49 formed between the valve operating pins 27 and 41.

The floating lever 44 is arranged with one end engaging the operating pin 27 and the other end engaging the operating pin 41. At the side of the lever 44 opposite that engaged by the operating pin 27 there is provided in the casing a stop screw 50 adapted to be engaged by the lever when the application valve 15 and the pilot valve 25 are in their seated positions shown. The operating pin 41 at the opposite side of plunger 47 is provided on the end opposite that connected to the release pilot valve 36 with a portion 51 of reduced diameter connecting the pin to a plunger 52 which is slidably mounted in the casing. A pair of spaced shoulders 53 are thereby formed and between said shoulders and straddling the portion 51 of the operating pin is disposed the adjacent bifurcated end of lever 44. A light bias spring 54 is provided which acts on the plunger 52 urging same in the direction of the release pilot valve 36.

The diaphragm portion 10 of the relay valve device comprises a casing secured to that of the application and release valve device 9 and in said casing there are provided four flexible diaphragms 55, 56, 57 and 58 arranged in coaxial relation with the plunger 47. These diaphragms are all spaced from each other and have successively reduced pressure areas, in the order named, the diaphragm 55 of greatest area being adjacent the application and release valve device 9.

At the left hand side of the largest diaphragm 55 there is provided a chamber 59 which is open to chamber 13 through a bore 60. The plunger 47 extends through the bore 60 and in chamber 59 is provided with an integrally formed follower or pressure plate 61 having one face engaging the diaphragm 55. At the opposite side of diaphragm 55 there is provided a chamber 62 containing a pressure plate 63 which is mounted against the right hand face of diaphragm 55. A stud and nut 64 are provided securing the plates 61 and 63 together and against the opposite faces of diaphragm 55. The plunger 47 is thus supported at one end by the guide piston 48 and at the other end by the diaphragm 55 thereby providing a positively movable structure and one which will move upon slight differentials between pressures in chambers 59 and 62. A light bias spring 65 in chamber 59 is arranged to act on plunger 47 for urging same in the direction of the right hand, for reasons which will later be brought out.

In chamber 62 there is provided a combined follower plate and strut 66 of smaller diameter than follower 61 and having a disc like end piece 67 engaging the left hand side of the diaphragm 56 and a cylindrical portion 68 extending from said end piece and engaging the pressure plate 63 secured to diaphragm 55. The end piece 67 is provided in its outer face with an annular groove and on the adjacent face of the diaphragm 56 there is provided an annular rib which fits into said groove for holding the follower 66 in operating relation with said diaphragm.

Between the diaphragms 56 and 57 there is provided a chamber 69 which contains a combined follower plate and strut 70 of smaller diameter but of the same construction as the follower plate 66 and connecting the adjacent faces of said diaphragms. A chamber 71 is formed between the diaphragms 57 and 58 and contains a combined follower plate and strut 72 similar to those above described and connecting said diaphragms. At the outer face of the diaphragm 58 there is provided a chamber 73 containing a bias spring 74 which acts through a plate 75 against the adjacent face of the diaphragm 58, said plate being supported in coaxial relation with said diaphragm on a boss 76 projecting from the adjacent face of the diaphragm.

The outer end of the spring 74 is supported in a cap nut 78 having screw-threaded engagement with the casing. This permits assembling of the spring 74 in its operating position after the other parts of the mechanism are assembled so as to thereby facilitate such assembly.

The pressure of spring 74 is less than that of spring 65 so that the latter may maintain the diaphragms in their normal or release positions, shown in the drawing. The only purpose of spring 74 is to coact with spring 65 to hold the several diaphragms and the followers interposed between in engagement with each other to avoid rattling or shaking of the parts when the brakes on the vehicle are released and the several chambers at the opposite sides of the diaphragms are at atmospheric pressure, as will be later described.

The magnet valve device portion 11 comprises a high speed magnet valve device 80, a medium speed magnet valve device 81 and a low speed magnet valve device 82.

The high speed magnet valve device 80 comprises an electro-magnet 83 and a pair of oppositely seating valves 84 and 85 adapted to be controlled by said magnet. The valve 85 is contained in a chamber 86 which is connected to a primary control pipe 87 and is adapted to control communication between said chamber and a chamber 88 which is connected through passages 89 and 90 to the diaphragm chamber 62. The valve 84 is contained in a chamber 91 which is connected through a choke 92 to a brake release passage 93, said valve being provided for controlling communication between said chamber and the chamber 88. The valves 84 and 85 are so arranged that upon energization of the electro-magnet 83 the valve 84 will be seated and the valve 85 will be unseated. A spring 94 is provided which acts on the valve 85 for seating said valve and for unseating the valve 84 upon de-energization of the electro-magnet 83.

The medium speed magnet valve device 81 comprises an electro-magnet 95 and a pair of oppositely seating valves 96 and 97. The valve 97 is contained in a chamber 98 which is connected to the primary control pipe 87 and is provided for controlling communication between said chamber and a chamber 99 which is connected through passages 100 and 101 to the diaphragm chamber 69. The valve 96 is contained in a chamber 102 which is connected to the release passage 93 through a choke 103, said valve being provided for controlling communication between said chamber and the chamber 99. The electro-magnet 95 is operative upon energization to seat the valve 96 and to unseat the valve 97. A spring 104 is provided acting on the valve 97 for seating same and for unseating the valve 96 upon de-energization of electro-magnet 95.

The low speed magnet valve device 82 comprises an electro-magnet 107 and a pair of oppositely seating valves 108 and 109 both of which are contained in a chamber 110 which is connected by way of passages 111 and 112 to the diaphragm chamber 71. The valve 108 is provided for controlling communication between the chamber 110 and a chamber 113 which is connected through a choke 114 to the release passage 93. The valve 109 is provided for controlling communication between chamber 110 and a chamber 115 which is connected to the primary control pipe 87. Energization of the electro-magnet 107 is adapted to effect unseating of the valve 108 and seating of the valve 109, while a spring 116 acting on the stem of the latter valve is adapted to operate upon deenergization of said electro-magnet to unseat the valve 109 and to seat the valve 108.

In the diaphragm portion of the relay valve device there are provided three chambers 117, 118 and 119 which are connected together by passages 120 and 121. The chamber 117 is connected to a passage 122 which leads to the primary control pipe 87, while the chamber 119 is connected to a passage 123 leading to the diaphragm chamber 73.

A check valve 124 is provided in chamber 117 for normally closing communication between said chamber and passage 90 leading to the diaphragm chamber 62. This check valve is subject to the pressure of a light seating spring 125 which is adapted to permit unseating of the check valve upon release of fluid under pressure from said chamber to permit the release of fluid under pressure from passage 90 by way of said chamber. In chamber 118 there is provided a similar check valve 126 and spring 127 for controlling a release communication between passage 100 and said chamber. A similar check valve 128 and spring 129 are provided in chamber 119 to control a release communication between passage 112 and said chamber.

The inshot valve device 12 comprises a casing secured to the magnet valve portion 11 of the relay valve device and containing a flexible diaphragm 130, an inshot or supply valve 131 at one side of said diaphragm, and a combined limiting and brake release valve 132 at the opposite side of said diaphragm, both of said valves being of the poppet type and arranged for control by said diaphragm.

The diaphragm 130 has at one side a chamber 133 which is connected through a bore 134 and a port 135 to the brake release passage 93. At the opposite side of the diaphragm there is provided a chamber 136 which is open to the atmosphere through a vent port 137.

The inshot valve 131 is contained in a chamber 138 which is connected to the primary control pipe 87 and is provided with a fluted stem 139 extending through a suitable bore in the casing and engaging a follower 140 disposed in chamber 133 and secured to one face of the diaphragm 130. A light bias spring 141 in chamber 138 acts on the inshot valve 131 for urging it toward its seated position.

A follower 142 disposed in chamber 136 is secured to the diaphragm 130 for movement therewith. This follower is provided with an operating stem 143 which extends through a suitable bore in the casing into a chamber 144 which is open to the vent pasage 137, communication being established between the chambers 136 and 144 through a breather port 145 provided in the casing along the stem 143. In the chamber 136 and encircling the stem 143 there is provided a spring 145 which acts on the follower 142 urging the diaphragm 130 in the direction for unseating the inshot valve 131. This spring is designed to provide a sufficient pressure on the diaphragm 130 to prevent movement thereof against the spring until a certain desired degree of fluid pressure is obtained in chamber 133, such as seven pounds per square inch.

The brake release valve 132 is contained in a chamber 146 which is connected to the brake release passage 93. This valve is provided with a fluted stem extending through a suitable bore in the casing into chamber 144 in coaxial relation with the diaphragm operated stem 143. A spring 147 in chamber 146 acts on the release valve 132 for urging it to its seated position shown in the drawing. The release valve 132 is adapted to be unseated by the diaphragm stem 143 upon deflection of the diaphragm 130 in an upwardly direction and subsequent to seating of the inshot valve 131 by spring 141.

In the drawing it will be noted that the valve 131 is shown in its unseated position and the valve 132 in its seated position and it will also be noted that there is a slight space between the end of the operating stem 143 and the end of the stem depending from the release valve 132. This space is slightly greater than the distance through which the inshot valve 131 has to move to its seated position so as to thereby insure that both valves will not be open at the same time.

The primary control pipe 87 is provided for conveying fluid under pressure to the relay valve device 1 for effecting an application of the brakes on a vehicle and through which fluid under pressure is adapted to be released from said relay valve device to release the brakes on a vehicle. Such supply and release of fluid under pressure to and from the primary control pipe 87 may be effected in any desired manner, as by the operation of the brake valve device 2. The brake valve device 2 may be of any suitable design, such as of the well known self-lapping type and which is provided with a handle 148 for operation by the motorman or engineer on the vehicle for controlling the supply and release of fluid under pressure to and from the primary control pipe 87.

The speed governor or speed responsive switch device 3 is provided to control the energization and deenergization of the magnet valve devices 80, 81 and 82 according to various speeds at which the vehicle may operate. This device may be of any suitable structure and is illustrated as comprising a casing 150 adapted to be mounted in any desired location on the body of the vehicle and having a chamber 151 containing a centrifuge 152 which is provided for operating a switch device 153.

The centrifuge 152 comprises a rotary member 154 carried on the end of a shaft 155 which is journaled in the casing and which is adapted to be rotated at a speed proportional to the speed or rate of travel of the vehicle, in any suitable manner, such as of by way of a connection (not shown) with a car wheel or with the axle thereof.

The rotary member 154 carries a pair of bell crank levers 156 disposed opposite to each other at the opposite sides of the axis of said member. Each of the bell crank levers 156 is provided at its outer end with a governor weight 157 while the inner end of each of said levers engages the lower face of a collar 158 secured to the lower end of an operating stem 159 of the switch device 153. In chamber 151 there is provided a spring 166 acting on the collar 158 which is adapted to yieldingly urge the operating stem 159 in a downward direction against the action of centrifugal force on the governor weights 157.

The upper part of the casing 150 is broken away to show three pairs of fixed contact fingers 160, 161 and 162. The operating stem 159 carries three movable contact members 163, 164 and 165 for engaging the pairs of contact fingers 160, 161 and 162, respectively, in bridging or circuit-closing relation.

The contact 163 is secured to the operating stem 159 under the contact fingers 160 and for movement with said stem, while the contacts 164 and 165 are slidably mounted on said stem between the contact fingers 161 and 162. The stem 159 is provided between the contacts 164 and 165 with a collar 167 secured to the stem. A spring 168 engaging one side of collar 167 acts on the contact 164 urging it in the direction of another collar 169 provided on the stem. A spring 170 acts against the opposite face of collar 167 and on the contact 165 for urging it toward a collar 171 provided on the stem 159.

It will be evident that as the shaft 155 is rotated from the wheel or axle of a vehicle truck at a speed proportional to the rate of travel of the vehicle the action of centrifugal force on the centrifuge weights 157 against the opposing force of spring 166 on collar 158 will position the stem 159 in various vertical positions depending upon the degree of vehicle speed. The parts are so designed as to obtain the position shown in the drawing with the contact 163 engaging or bridging the contact fingers 160 and with the contact 164 engaging contact fingers 161 whenever the speed of the vehicle exceeds a certain relatively high degree or limit, such as 60 miles per hour. When the speed of the vehicle is below this high speed limit, the contact 163 will be disengaged from the contact fingers 160. The pressure of biasing spring 168 will yieldingly retain the contact 164 in engagement with the contact fingers 161 over a range of vehicle speed between said high speed limit and a medium speed limit, such as 40 miles per hour. Below this medium speed limit the collar 169 will disengage contact 164 from contact fingers 161. The contact 165 will be supported by the collar 171 in a position out of engagement with the contact fingers 162 whenever the speed of the vehicle exceeds a certain low speed limit, such as 20 miles per hour. At and below the low speed limit the contact 165 will be in engagement with the contact fingers 162.

The pneumatic switch device 4 comprises a casing containing a piston 175 having at one side a pressure chamber 176 connected to the primary control pipe 87 and having at the opposite side a chamber 177 which is open to the atmosphere through a breather port 178. A light bias spring 179 in chamber 177 acts on the piston 175 for urging same in the direction of chamber 176.

The piston 175 is provided with an operating stem 180 carrying at its outer end a contact 181. A pair of stationary contact fingers 182 are arranged to be engaged by the contact 181 upon movement thereof by piston 175 when fluid under pressure is supplied to the pressure chamber 176. One of the contact fingers 182 is connected to a wire 183 leading to any suitable source of electric current on the vehicle such as to one terminal of a battery 184, the other terminal of which is grounded. The other contact finger 182 is connected to a wire 186 which leads to the switch device 153 in the speed governor device 3 wherein said wire is connected to one of the contact fingers 160, one of the contact fingers 161 and one of the contact fingers 162.

The other contact finger 160 in the speed governor device is connected to one terminal of the high speed electro-magnet 83, the other terminal of which is grounded. The other contact finger 161 in the speed governor device is connected to one terminal of the medium speed electro-magnet 95 and the other terminal of this magnet is grounded. The other contact finger 162 in the speed governor device is connected to one side of the low speed electro-magnet 107 which has its other terminal grounded.

The main reservoir 6 is adapted to be supplied with fluid under pressure in any conventional manner. The fluid under pressure thus supplied to the main reservoir 6 is adapted to flow to pipe 185 leading to the brake valve device 2 and to the feed valve device 7.

The feed valve device 7 is provided for controlling the supply of fluid under pressure from pipe 185 to pipe 19 and is operative in the usual manner to reduce the pressure of fluid supplied to the pipe 19 to a desired relatively low degree for supply to the application valve chamber 17 in the application and release valve device 9. With the application valve 15 in its normal or seated position shown in the drawing the fluid pressure obtained in chamber 17 and acting on one face of the application valve 15 is adapted to equalize through port 21 into chamber 20 at the opposite side of the application valve and to thus permit spring 23 to hold the application valve in its closed position.

Operation

In operation, let it be assumed that the brakes on the vehicle are released. Under this condition the primary control pipe 87 will be void of fluid under pressure and all parts of the relay valve device 2, the speed governor device 3 and of the pneumatic switch device 4 will be in the positions shown in the drawing. When in this condition the several diaphragm chambers in the relay valve device will be vented by way of the primary control pipe 87 and brake valve device 2, as will be hereinafter more fully brought out, and this condition permits the spring 65 to hold the several diaphragms and the plunger 47 in the positions shown. With the plunger 47 and floating lever 44 thus positioned, the application valve 15 will be seated to prevent flow of fluid under pressure from chamber 17 to chamber 13 and the release valve 28 will be unseated connecting chamber 13 to the vent port 31, whereby the secondary control pipe 14 and thereby the brake cylinder device 5 will be open to the atmosphere and void of fluid under pressure. The application valve 15 will be seated as above described due to the action of spring 23 since the fluid pressures in chambers 17 and 20 will be equalized through port 21. Likewise pilot valve 25 will be seated by spring 26.

With the vehicle operating at or above the high speed limit, such as 60 miles per hour, if it is desired to apply the brakes on the vehicle, the brake valve device 2 is operated in the usual manner to supply fluid to the primary control pipe 87 at whatever pressure is required for providing a chosen rate of deceleration of the vehicle.

The fluid under pressure supplied to the primary control pipe 87 flows to piston chamber 176 in the switch device 4 and when a certain relatively low pressure is thus obtained in said chamber, said presure acting on piston 175 moves said piston against spring 179 and thereby shifts the contact 181 into engagement with the contact fingers 182. The battery 184 is thereby connected to wire 186 and to one of each pair of fingers 160, 161 and 162 in the speed governor device 3.

With the speed governor device 3 in the high speed position shown in the drawing, the contacts 163 and 164 are in their circuit-closing positions, so that electric current supplied from the battery 184 to wire 186 is then supplied to the electro-magnets 83 and 95 of the high and medium speed magnet valve devices, respectively, thereby energizing said electro-magnets. The energization of the high speed electro-magnet 83 operates to seat the valve 84 and to unseat the valve 85 thereby connecting the primary control pipe 87 to chamber 88, while the energization of the medium speed electro-magnet 95 acts to seat valve 96 and unseat valve 97 so as to connect the primary control pipe 87 to chamber 99. Under this speed condition the electro-magnet 107 of the low speed magnet valve device remains deenergized so that the valve 108 remains seated and the valve 109 unseated.

Fluid at the pressure supplied to the primary control pipe 87 then flows past the unseated high speed magnet valve 85 to chamber 88, and thence through passage 89 to diaphragm chamber 62. Fluid under pressure also flows from the primary control pipe 87 past the unseated medium speed magnet valve 97 to chamber 99 and thence through passages 100 and 101 to diaphragm chamber 69, and also past the unseated low speed magnet valve 109 to chamber 110 and thence through passages 111 and 112 to diaphragm chamber 71. Furthermore, fluid under pressure from the primary control pipe 87 also flows directly through passage 122 and the several check valve chambers 117, 118 and 119 to diaphragm chamber 73.

Under this high speed condition the fluid pressures are thus equalized on the opposite faces of the diaphragms 56, 57 and 58, but the diaphragm 55 is subjected to the differential of fluid pressures acting in chambers 62 and 59 and since at the time the application of brakes is initiated chamber 59 is at atmospheric pressure, a force is obtained on diaphragm 55 for effecting movement thereof toward the left hand. The equalization of the fluid pressures on diaphragms 56, 57 and 58 maintains same in a balanced and therefore ineffective condition, but spring 74 acts upon movement of the diaphragm 55 to hold the other diaphragms in the engaging relation shown to avoid rattling and chafing thereof. Such equalization of pressures also prevents subjecting the diaphragms 56, 57 and 58 to undue stresses under this particular condition.

At the same time as fluid under pressure is supplied to the several diaphragm chambers as above described, fluid under pressure supplied from the primary control pipe 87 to the inshot valve chamber 138 flows past the unseated inshot valve 131 to passage 93 and thence through port 134 to chamber 133 at the lower face of the inshot diaphragm 130. At this time the release valve 132 is seated and the magnet valves 96, 108 and 84 are also seated so that fluid under pressure supplied to the diaphragm chamber 133 can not escape. As a consequence, when the pressure obtained in the diaphragm chamber 133 past the inshot valve 131 is built up sufficiently to overcome the opposing pressure of spring 145, said diaphragm is deflected in an upwardly direction and permits spring 141 to seat the inshot valve 131 and prevent further supply of fluid under pressure to the chamber 133.

The spring 145 is so related to the effective area of the flexible diaphragm 130 as to permit movement of said diaphragm as just described when a relatively low pressure such as 7 pounds is obtained in the diaphragm chamber 133. If for any reason the pressure of fluid obtained in chamber 133 should exceed this relatively low pressure of 7 pounds, then such excess pressure will cause further deflection of the diaphragm 130 in an upwardly direction and this movement will act through the stem 143 to unseat the release valve 132 to thereby release fluid under pressure from chamber 133. When the pressure of fluid in chamber 133 is thus reduced to a sufficient degree, the spring 145 will then move the diaphragm 130 in a downwardly direction permitting the release valve 132 to close. In this manner the pressure of fluid which it is possible to obtain in chamber 133 and acting on the diaphragm 130 is limited to a relatively low degree, such as 7 pounds, whenever an application of the brakes is effected and this is a very important feature in that it avoids over-stressing of said diaphragm and premature failure thereof. In this same connection it will also be noted that the travel of the diaphragm 130 need only be sufficient to effect unseating of the inshot valve 131 in one position and of the release valve 132 in the opposite position, and therefore is held to a relatively low degree which will also insure a relatively long operating life of the diaphragm.

When the diaphragm 55 is deflected toward the left hand as above described, it acts to shift plunger 47 and thereby the fulcrum pin 46 for the floating lever 44 in the same direction. The pressure of spring 26 acting on the application pilot valve 25 is such as to hold the operating pin 27 against movement upon the preliminary movement of plunger 47 just described and to thereby provide a fulcrum for the associated end of the lever 44, and as a consequence, the movement of the plunger 47 actuates the opposite end of said lever to first move the release pilot valve 36 relative to the release valve 29 and into seating engagement therewith after which further operation of the lever moves the release valve 29 into engagement with its seat 30.

After the release pilot valve 36 and the release valve 29 are thus both seated, they act through the pin 41 to provide a fulcrum for the associated end of the floating lever 44 so that further movement of the plunger 47 in the direction of the left hand then actuates said lever to shift the pin 27 in the direction of the application valve 15 to effect unseating first of the pilot valve 25 and then of the application valve 15. The unseating of the release pilot valve 25 vents fluid under pressure from chamber 20 to chamber 13 at a rate substantially equal to the rate of supply through the relatively small port 21, thereby reducing the force acting on the application valve 15 urging it to its seat so that a relatively low pressure of pin 27 against the application valve 15 will unseat same against the opposing pressure of spring 23.

Unseating of the application valve 15 as just described opens communication between chamber 17 and chamber 13 whereupon fluid at the pressure supplied by the feed valve device 7 to the pipe 19 flows to chamber 13 and thence through the secondary control pipe 14 to the brake cylinder device 5, thereby applying the brakes on the vehicle.

The fluid pressure thus obtained in chamber 13 and acting in the brake cylinder device 5 flows through bore 60 in the relay valve device to chamber 59 at the left hand face of the large diaphragm 55 and therein acts on said diaphragm in conjunction with the relatively light force of bias spring 65 to oppose the pressure provided in chamber 62 and acting on the opposite face of said diaphragm. When this opposing pressure is increased sufficiently, due to the supply of fluid under pressure to chamber 13 and to the brake cylinder device 5, to overcome the pressure of fluid in chamber 62, then the diaphragm 55 is deflected in the direction of the right hand and such movement operates through the plunger 47 and lever 44 to relieve the pressure of pin 27 on the application valve 15 and pilot valve 25. As a result, the spring 23 seats the application valve 15 and the spring 26 seats the pilot valve 25 thereby cutting off the further supply of fluid under pressure to chamber 13 and to the brake cylinder device 5.

The application and release valve device 9 thus operates to supply fluid under pressure to chamber 13 and from thence to the secondary control pipe 14 and brake cylinder device 5 until the pressure of fluid obtained therein substantially equals that of the control pressure provided in the diaphragm chamber 62.

It will therefore be evident that if a higher or lower pressure is provided in the primary control pipe 87 or if the pressure of fluid therein is increased to increase the degree with which the brakes are applied, the diaphragm 55 and the application and release valve device 9 will operate as above described to provide a corresponding pressure in the secondary control pipe 14 and brake cylinder device 5. It will also be noted that the large diaphragm 55 is the control diaphragm for the application and release valve device when the train or vehicle is operating at or above the high speed limit of 60 miles per hour.

In order that the application of brakes effected above the high speed limit of 60 miles per hour will not cause slipping or sliding of the vehicle wheels as the speed of the vehicle reduces, the governor device operates at the time the vehicle speed is reduced below said high speed limit to move the contact 163 out of engagement with the contact fingers 160 thereby opening the circuit through and effecting deenergization of the high speed electro-magnet 83. As a result, spring 94 acts to seat the supply valve 85 and to unseat the valve 84, thereby disconnecting the diaphragm chamber 62 from the primary control pipe 87 and connecting same to the release passage 93 leading to the inshot valve device 12.

Fluid under pressure then flows from the diaphragm chamber 62 to the inshot valve device at a rate governed by choke 92, and as a result, the pressure in chamber 133 acting on one face of the diaphragm 130 is increased to above the opposing pressure of spring 145 and moves said diaphragm against said spring and unseats the release valve 132. Fluid under pressure in chamber 62 is then released past the release valve 132 until reduced to a degree at which spring 145 predominates and moves the diaphragm 130 in a downwardly direction to permit seating of the release valve 132 under the action of spring 147. In this manner the pressure of fluid in diaphragm chamber 62 is reduced to the relatively low degree, such as the 7 pounds above mentioned and provided for by the design of the inshot valve device. The pressure of fluid acting in the diaphragm chambers 69, 71 and 73 of the relay valve device, however, remains the same as before movement of the governor contact 163 to its open position. As a result, the diaphragms 57 and 58 remain in a balanced condition as to fluid pressures, while the diaphragm 55 is subjected to a differential of fluid pressures equal to the difference between those acting in chambers 62 and 69.

The force now opposing that due to the pressure of fluid in chamber 59 is equal to the force due to the differential between the fluid pressures in chambers 62 and 69 acting on diaphragm 55 plus the force due to the relatively low pressure of 7 pounds in chamber 62 acting on the area of the diaphragm 55.

As a result of this reduction in control force acting in the direction of the left hand the pressure of fluid in diaphragm chamber 59 obtained prior to the opening of governor switch contact 163 acts to move the diaphragm stack in the direction of the right hand. This movement of the diaphragm stack shifts the fulcrum pin 46 for the lever 44 in the same direction and rocks said lever in a counterclockwise direction about pin 50. As the lever 44 is thus operated it acts first to unseat the release pilot valve 36 from the release valve 29 so as to supply fluid under pressure from chamber 13 to chamber 33 wherein said pressure acts on the release valve piston 28 to substantially balance the fluid pressure in chamber 13 acting on the release valve 29 tending to hold it seated. At about the same time as this condition is obtained, the nut 38 on the end of the release pilot valve stem 37 engages piston 28 so that further movement of the lever 44 acts to pull the release valve 29 from its seat whereupon fluid under pressure is vented from chamber 13 and thereby from the secondary control pipe 14 and brake cylinder device 5, and a corresponding reduction in pressure occurs in chamber 59.

This releasing of fluid under pressure from brake cylinder device 5 and diaphragm chamber 59 continues until the force of the fluid pressure acting on the left hand face of the diaphragm 55 becomes reduced to a degree slightly below the opposing control force of fluid pressure acting on the smaller diaphragm 56, at which time said control force effects movement of the plunger 47 in the direction of the left hand. This operation of the plunger again operates lever 44 to seat the pilot valve 36 against the release valve 29 and to then seat said release valve so as to thereby prevent the further release of fluid under pressure from chamber 13 and from the brake cylinder device 5. The pressure of fluid then remaining in the brake cylinder device is proportional to that acting in chamber 69 on the diaphragm 56 the effective area of which is such as to limit the brake application on the vehicle to a degree which will minimize the danger of sliding of the vehicle wheels as the speed of the vehicle becomes reduced below the maximum speed limit of 60 miles per hour.

At the time the speed of the vehicle becomes further reduced to the medium speed limit of say 40 miles per hour, the collar 169 on the governor operating stem 159 engages the contact 164 so that any further reduction in speed moves said contact out of engagement with the contact fingers 161. When this occurs the electro-magnet 95 of the medium speed magnet valve device is deenergized which permits seating of valve 97 and unseating of valve 96. Upon unseating of valve 96 fluid under pressure in diaphragm chamber 69 is vented through passages 101 and 100, past said valve and through the release choke 103 to the release passage 93 leading to the inshot valve device 12.

The inshot valve device 12 then operates as hereinbefore described to release fluid under pressure from chamber 69 until such pressure is reduced to the relatively low degree of 7 pounds, above mentioned and which still is effective in diaphragm chamber 62. The diaphragm 56 is now in a balanced condition as to opposing fluid pressures. The pressure of fluid acting in diaphragm chambers 71 and 73 still remains, however, at the same degree as initially provided in the primary control pipe 87 and, as will be evident, the diaphragm 57 now becomes effective to control the pressure acting in the secondary control pipe 14 and in the brake cylinder device 5. Since the diaphragm 57 is, however, of less effective area than diaphragm 56, the relay valve device 9 will again operate, as above described, to reduce the pressure in the brake cylinder device 5 to a value proportional to the area of diaphragm 56, thereby adjusting such pressure to the reduced speed of the train.

Now when the speed of the vehicle becomes further reduced to the low speed limit, say 20 miles per hour, the contact 165 controlled by the governor device moves into engagement with the contact fingers 162 thereby supplying electric current from wire 186 to the electro-magnet 107 of the low speed magnet valve device. The electromagnet 107 is thereby energized and operates to unseat the valve 108 and to seat the valve 109. The opening of valve 108 establishes communication between the diaphragm chamber 71 and the release passage 93 by way of the release choke 114 whereupon the inshot valve device 12 operates as hereinbefore described to reduce the pressure in diaphragm chamber 71 to the relatively low degree of 7 lbs. which also remains effective in diaphragm chambers 69 and 62. The smallest diaphragm 58 of the diaphragm stack now becomes effective to control the operation of the application and release valve device 9 and since its effective area is less than that of diaphragm 57 which controlled the degree of brake application between the speed limits of 40 and 20 miles per hour, the relay valve device 9 will again operate to reduce the fluid pressure in the secondary control pipe 14 and brake cylinder device 5 to a degree which, acting in chamber 59 on the largest diaphragm 55, substantially counteracts that acting in chamber 73 on the smallest diaphragm 58. The degree of the brake application on the vehicle is thereby reduced or adjusted to the relatively low speed limit of the vehicle and this degree of application will be maintained until the vehicle is brought to a stop.

If it is desired to effect a complete release of the brakes on the vehicle after the vehicle is brought to a stop, the brake valve device 2 is operated in the usual manner to completely release the fluid under pressure from the primary control pipe 87 and thereby from diaphragm chamber 73 through the several check valve chambers 117, 118 and 119. The fluid pressure remaining in diaphragm chambers 62, 69 and 71 then unseats the check valves 124, 126 and 128, respectively, and is dissipated through the primary control pipe 87. The force urging the diaphragm stack toward the left hand is thereby relieved which permits the pressure of fluid acting in diaphragm chamber 59 to move the diaphragm stack in the direction of the right hand to thereby open the release pilot valve 36 and release valve 29, as hereinbefore described, to permit a complete release of fluid under pressure from the secondary control pipe 14 and from the brake cylinder device 5. The light bias spring 65 is provided to act on the plunger 47 at this time to bias the diaphragm stack in the direction of the right hand with a sufficient pressure to insure the complete release of fluid under pressure from the secondary control pipe and from the brake cylinder device 5.

When the pressure of fluid in the primary control pipe 87 is reduced to a relatively low degree, such as one or two pounds, spring 179 in the switch device 4 acts to return the piston 175 to its normal position shown to thereby move the contact 181 out of engagement with the contact fingers 182. The supply of electric current to the governor device is thereby cut off and the electro-magnet 107 of the low speed magnet valve device becomes deenergized permitting spring 116 to unseat the valve 109 and seat the valve 108. All of the electro-magnet devices are now deenergized and in the same condition as before the brakes on the vehicle were applied, and this condition will be maintained until a subsequent application of the brakes is effected.

When fluid under pressure is vented from the several diaphragm chambers 62, 69 and 71 by way of the check valves 124, 126 and 128 as above described, the pressure of fluid in diaphragm chamber 133 of the inshot valve device 12 reduces by way of the unseated magnet valves 84, 108 and 96 and through said chambers and when thus reduced to a sufficient degree the spring 145 moves the diaphragm 130 in a downwardly direction to unseat the inshot valve 131. After the inshot valve 131 is thus unseated a further release of fluid under pressure from diaphragm chamber 133 and release passage 93 occurs through chamber 138 and the primary control pipe 87. The inshot valve device 12 is thus conditioned for a subsequent application of the brakes.

Let it be assumed that the brakes on the vehicle are released and the vehicle is operating at a speed below the high speed limit of 60 miles per hour but above the medium speed limit of 40 miles per hour, in which case the governor control contact 163 is open. If under this condition it is desired to effect an application of the brakes fluid under pressure is supplied to primary control pipe 87 as hereinbefore described and thence to the switch device 4 for effecting the operation of said switch device to supply electric current to the wire 186 and thence to the governor device. Current thus supplied to the governor device is supplied through the contact 164 to the medium speed electro-magnet 95 and effects energization thereof to seat valve 96 and to unseat valve 97. Since the governor contact 163 is out of engagement with the contact fingers 160 under this particular condition however, it will be noted that the high speed electro-magnet 83 is not energized so that the valve 85 remains seated and the valve 84 unseated.

With the electro-magnet devices conditioned as just described, fluid under pressure supplied to the primary control pipe 87 flows past the inshot valve 131 to passage 93 and thence to chamber 91 in the high speed magnet valve device 80. From chamber 91 fluid under pressure flows to chamber 88 and then through passages 89 and 90 to diaphragm chamber 62 between the largest diaphragm 55 and the adjacent, smaller diaphragm 56. This supply of fluid to diaphragm chamber 62 continues until the pressure obtained in diaphragm chamber 133 of the inshot valve device 12 is built up to a degree sufficient to overcome the opposing pressure of spring 145 at which time such diaphragm is deflected upwardly permitting seating of the inshot valve 131. The inshot valve device thus limits the pressure of fluid obtained in diaphragm chamber 62 to the 7 lb. degree, above mentioned.

This relatively low pressure obtained in the diaphragm chamber 62 is adapted to effect prompt movement of diaphragm 55 in the direction of the left hand and thereby prompt operation of the application and release valve device 9 to provide a corresponding pressure in the secondary control pipe 14 and in the brake cylinder device 5. This is an important feature in that it insures prompt movement of the brake shoes on the vehicle into contact with the vehicle wheels.

At the same time as fluid under pressure is supplied to diaphragm chamber 62, as just described, fluid under pressure also flows from the primary control pipe 87 past the unseated medium speed magnet valve 97 to chamber 99 and thence through passages 100 and 101 to chamber 69 between the diaphragms 56 and 57, and also from the primary control pipe past the low speed magnet valve 109 to passage 111 and thence to chamber 71 between the flexible diaphragms 57 and 58. Fluid under pressure also flows directly from the primary control pipe 87 through passage 122, check valve chambers 117, 118 and 119 and passage 123 to chamber 73 at the right hand face of the smallest diaphragm 58. The fluid pressures acting on the opposite sides of the flexible diaphragms 57 and 58 are thereby equalized for reasons hereinbefore described, while the fluid pressure obtained from the primary control pipe in chamber 69 acting on the diaphragm 56 is adapted to coact with the relatively low pressure obtained in diaphragm chamber 62 to effect operation of the application and release valve mechanism 92 to provide a proportionate pressure in the secondary control pipe 14 and brake cylinder device 5. The pressure of fluid thus obtained in the secondary control pipe and brake cylinder device is however limited by the relatively small effective area of diaphragm 56, in the same manner as above described, to a degree which will minimize the danger of sliding of the vehicle wheels in the range of speed between the high and medium speed limits, such as 60 miles per hour and 40 miles per hour.

When, due to the application of brakes just described, the speed of the vehicle is reduced to a point slightly below the medium speed limit of 40 miles per hour, the speed governor device 3 acts to move the contact 164 out of engagement with the fingers 161 thereby effecting deenergization of the medium speed electromagnet 95, as a result of which the diaphragm chamber 69 is placed in communication with the inshot valve device 12 which then operates to reduce the pressure therein to the same degree as acting in diaphragm chamber 62. The relay valve device is then controlled by the primary control pipe pressure acting in chamber 71 on the diaphragm 57 and is reflected in a reduction in pressure in the secondary control pipe 14 and in the brake cylinder device 5 to a degree corresponding to the reduced speed condition of the vehicle, in the same manner as hereinbefore described.

When the speed of the vehicle becomes further reduced to the low speed limit of 20 miles per hour, the governor device 3 effects engagement of the contact 165 with the contact fingers 162. The low speed electro-magnet 107 is thereby energized which connects the diaphragm chamber 71 to the inshot valve device 12. The inshot valve device then operates to reduce the pressure in chamber 71 to the 7 pound degree above described whereupon the primary control pipe pressure acting in diaphragm chamber 73 on the smallest diaphragm 58 acts to control the relay valve device and to permit a reduction in pressure in the secondary control pipe 14 and brake cylinder device 5 to a degree in accordance with the reduced vehicle speed, as above described. The pressure acting in chamber 73 on the smallest diaphragm 58 then controls the degree of brake application on the vehicle for all further reduction in vehicle speed.

Let it be assumed that at the time the brakes on the vehicle are applied the vehicle is operating at a speed between the medium and low speed limits of say 40 miles and 20 miles per hour. Under this condition the governor contacts 163 and 164 will be out of engagement with the contact fingers 160 and 161 and all of the magnet valve devices will therefore be deenergized at the time an application of the brakes is initiated. Under this condition fluid under pressure supplied to apply the brakes will flow from the primary control pipe 87 through the inshot valve device 12 to passage 93 and thence past the high speed magnet valve 84 to passage 100 leading to diaphragm chamber 62 and also past the medium speed magnet valve 96 to passage 100 leading to chamber 69, the pressure obtained in the diaphragm chambers 62 and 69 being limited by the operation of the inshot valve device, as hereinbefore described, to the relatively low degree such as 7 pounds.

This 7 pound pressure obtained in diaphragm chamber 62 acting on the large diaphragm 55 is adapted to effect operation of said diaphragm and thereby of the application and release valve device 9 to effect a prompt supply of fluid under pressure to the secondary control pipe 14 and brake cylinder device 5 to a like degree for effecting movement of the brake shoes into engagement with the vehicle wheels. The fluid pressures are balanced on the opposite sides of the diaphragm 56 under this condition as will be apparent.

At the same time as fluid under pressure is supplied to diaphragm chambers 62 and 69 by way of the inshot valve device 12 as just described, fluid under pressure also flows from the primary control pipe 87 past the low speed magnet valve 109 to passage 111 and thence to diaphragm chamber 71, and fluid under pressure also flows directly from the primary control pipe 87 to diaphragm chamber 73 on the outer face of the smallest diaphragm 58. The fluid pressures acting on the smallest diaphragm 58 are thereby equalized and the fluid pressure obtained in the diaphragm chamber 71 acting on the diaphragm 57 is adapted to control the operation of the relay valve device 9 and to limit the pressure obtained in the brake cylinder device 5 to a degree corresponding to the relative small effective area of diaphragm 57 and therefore to the speed of the vehicle. In other words, if an application of the brakes is effected at the time the vehicle is operating between speeds of 40 and 20 miles an hour the diaphragm 57 is effective to limit the brake application to a degree which will greatly reduce the danger of wheel sliding in this speed range.

When, due to the application of brakes just described, the speed of the vehicle becomes reduced to the low speed limit of 20 miles per hour, governor device 3 moves the contact 165 into contact with the contact fingers 162 and thereby effects energization of the low speed electro-magnet 107. The low speed electro-magnet valve 108 is thereby unseated and the valve 109 is seated and as a result, diaphragm chamber 71 is placed in communication with the inshot valve device 12 which then operates to reduce the pressure in said chamber to the relatively low degree of 7 pounds as hereinbefore described. The primary control pipe pressure in diaphragm chamber 73 acting on the smallest diaphragm 58 then becomes effective to limit the application of brakes on the vehicle, in the same manner as hereinbefore described, to a degree which will tend to avoid sliding of the wheels at and below the low speed limit of 20 miles per hour.

If at the time the application of brakes on the vehicle is initiated the vehicle is operating at or below the low speed limit of 20 miles per hour, then both governor contacts 163 and 164 will be out of engagement with their respective contact fingers 160 and 161, while the governor contact 165 will be bridging the contact fingers 162. The high and medium speed magnet valve devices will therefore remain deenergized and the low speed magnet valve device will be promptly energized. Thus fluid under pressure supplied to the primary control device 87 and thence through the inshot valve device 12 will be supplied past the low speed magnet valve 108 to passage 111 and thence to diaphragm chamber 71 at the same time as it is supplied to the diaphragm chambers 62 and 69. As a result, the fluid pressures will be equalized on diaphragms 56 and 57 and the relatively low pressure of 7 pounds obtained in chamber 62 and acting on the largest diaphragm 55 will effect prompt operation of the application and release valve device to provide a corresponding pressure in the secondary control pipe 14 and in brake cylinder device 5 in the same manner and for the same purpose as when the brakes are applied with the vehicle operating at a speed above the low speed limit, and as hereinbefore described. At the same time as fluid pressure is obtained in diaphragm chamber 62 for operating the largest diaphragm 55 fluid under pressure is also supplied from the primary control pipe 87 directly to diaphragm chamber 73 to act on the smallest diaphragm 58. The smallest diaphragm then operates to control the degree of pressure obtained in the secondary control pipe 15 and brake cylinder device 5, above that obtained from the fluid pressure provided in diaphragm chamber 62, and to limit such pressure to a degree corresponding to the relatively low speed of the vehicle.

From the above it will be noted that regardless of the speed at which the vehicle is operating at the time an application of the brakes is initiated on the vehicle, fluid under pressure is always supplied to the diaphragm chamber 62 to act on the largest diaphragm 55 for initiating the operation of the application and release valve mechanism 9. This supply is by way of the high speed magnet valve device 80 whenever the speed of the vehicle is above the high speed limit at the time the brake application is initiated and at which time the inshot valve device 12 serves no useful function, however, whenever the speed of the vehicle is below the high speed limit at the time a brake application is initiated, this supply of fluid under pressure to chamber 62 is by way of the inshot valve device 12 and consequently limited to the relatively low degree of 7 pounds above mentioned. The importance of this feature will be brought out. An approximately 7 pounds per sq. in. fluid pressure is required in the brake cylinder device 5 to effect operation thereof to move the brake shoes on the vehicle into engagement with the vehicle wheels and it is desired that this movement be effected promptly to avoid undue rattling and vibration of the shoes, and brake rigging carrying same, during movement thereof between their release positions and their application positions. A relatively low degree of pressure, such as 7 pounds, in chamber 62 acting on the relatively large area of diaphragm 55 will provide a like pressure in the brake cylinder device which will effect prompt movement of the brake shoes into engagement with the wheels as just described. However, the same degree of pressure acting on any of the other diaphragms could not provide such prompt movement due to the less effective area of the diaphragms and, as a consequence, the lower force for operating the application and release valve mechanism 9 to its brake applying position.

In other words, consider the extreme diaphragms 55 and 58 of the stack and assume that the diaphragm 58 has four tenths the effective area of diaphragm 55. Now 7 lbs. pressure in chamber 62 will provide a like pressure in brake cylinder devices for moving the brake shoes into engagement with the vehicle wheels as desired, but the same degree of fluid pressure acting in chamber 73 on diaphragm 58 will provide only four-tenths the amount of pressure in the brake cylinder device 5 and therefore less than one-half that required for moving the shoes into engagement with the wheels. It will be therefore apparent that if the diaphragm 58 controlled movement of the shoes into engagement with the wheels it would require approximately 17½ lbs. pressure in diaphragm chamber 73 for actuating the diaphragm 58. Obviously it would take a greater period of time to obtain 17½ lbs. pressure in chamber 73 than 7 lbs. pressure in the diaphragm chamber 62, so that if the diaphragm 58 were effective to control the movement of the brake shoes against the wheels such movement would be delayed and unduly slow resulting in rattling and vibration, such as above described. Such rattling and vibration is however minimized with the improved structure since, regardless of the condition of the vehicle as to speed at the time an application of brakes is initiated, a sufficient degree of pressure is provided in diaphragm chamber 62 to act on the largest diaphragm 55 to insure prompt movement of the brake shoes against the wheels. After this initial supply of fluid pressure to the brake cylinder device the further supply of fluid to the brake cylinder device is limited to a pressure dependent upon which of the diaphragms 55, 56, 57 or 58 is effective at the time.

It will be noted that whenever the brakes on the vehicle are applied all of the diaphragms 55, 56, 57 and 58 are subject to fluid pressure, the diaphragm or diaphragms to the right of the control diaphragm above the low speed limit being subject to the same degree of fluid pressure as the control diaphragm, while below the high speed limit, the diaphragm or diaphragms to the left of the control diaphragm are subject to the pressure of fluid supplied by the inshot valve device. This is important in that it prevents undue stressing or buckling of the diaphragms and it also insures that the diaphragms will be held in cooperative relation at all times to prevent chafing of the parts and to prevent the follower plates between the diaphragms from shifting from their operating positions.

In the operation of the magnet valve devices to vent fluid under pressure from the various diaphragm chambers as the speed of the vehicle reduces it will be noted that one or another of the release chokes 103, 114 and 92 controls the rate of such release and also the rate at which such fluid pressure is supplied to the inshot valve device 12. A slight increase in pressure obtained in the inshot valve device 12 on the diaphragm 130 by such supply then operates said diaphragm to effect unseating of the release valve 132 to release the fluid pressure from diaphragm chamber 130 so as to limit the increase in pressure on said diaphragm. By this arrangement it will be evident that the pressure of fluid obtained in chamber 133 acting on diaphragm 130 will never materially exceed the opposing pressure of the control spring 145. By thus limiting the pressure obtainable on the diaphragm 130 to a relatively low degree and limiting the movement of the diaphragm, as hereinbefore described, undue stressing of this diaphragm is avoided and relatively long life thereof is assured.

It will now be seen that, regardless of the control pressure provided in the primary control pipe 87 by the operator, the improved brake equipment will provide in the secondary control pipe 14 and in the brake cylinder device 5 a pressure which is proportionate thereto and to the speed of the vehicle and will automatically reduce the pressure acting in the secondary control pipe 14 and in the brake cylinder device 5, as the speed of the vehicle reduces, for the purpose of minimizing the danger of slipping or sliding of the vehicle wheels, and without any change in pressure in the primary control pipe 87 by the operator. It will also be seen that operation of the brake cylinder device 5 to effect prompt movement of the brake shoes into engagement with the vehicle wheels upon initiating an application of the brakes on the vehicle is assured regardless of which of the diaphragms is effective to control the degree of the application.

While one illustrative embodiment of the invention has been described in detail, it is not the intention to limit the scope to that embodiment or otherwise than by the terms of the appended claims.

Having now described my invention, what I claim as new and desire to secure by Letters Patent, is:

1. In a vehicle brake system, in combination, means having a plurality of chambers, valve means operative in accordance with variations in fluid pressure in said chambers for controlling the degree of brake application on the vehicle, supply means for supplying fluid under pressure for effecting an application of the brakes on the vehicle, pressure limiting means for supplying fluid from said supply means at a pressure which is less than supplied by said supply means, and means controlled by a variable operating condition of the vehicle for selectively connecting, in accordance with changes in said operating condition, one or more of said chambers to said supply means and the other chamber or chambers to said pressure limiting means.

2. In a vehicle brake system, in combination, means having a plurality of chambers, valve means operative in accordance with variations in fluid pressure in said chambers for controlling the degree of brake application on the vehicle, supply means for supplying fluid under pressure for effecting an application of the brakes on the vehicle, pressure limiting means for supplying fluid from said supply means at a pressure which is less than supplied by said supply means, and means controlled by a variable operating condition of the vehicle for selectively connecting, in accordance with changes in said operating condition, one or more of said chambers to said supply means and at least one of said chambers to said pressure limiting means.

3. In a vehicle brake system, in combination, means having a plurality of chambers, valve means operative in accordance with variations in fluid pressure in said chambers for controlling the degree of brake application on the vehicle, supply means for supplying fluid under pressure for effecting an application of the brakes on the vehicle, pressure limiting means for supplying fluid from said supply means at a pressure which is less than supplied by said supply means, and means controlled by a variable operating condition of the vehicle operative at one time to connect all of said chambers to said supply means and operative at other times, according to different changes in said operating condition, to selectively disconnect one or more of said chambers from said supply means and to connect same to said pressure limiting means.

4. In a vehicle brake system, in combination, means having a plurality of chambers, valve means operative in accordance with variations in fluid pressure in said chambers for controlling the degree of brake application on the vehicle, supply means for supplying fluid under pressure for effecting an application of the brakes on the vehicle, means controlled by a variable operating condition of the vehicle for selectively connecting, in accordance with changes in said operating condition, one or more of said chambers to said supply means, and pressure limiting means operative independently of the operating condition of the vehicle and controlling the supply of fluid under pressure from said supply means to one of said chambers and operative to cut off said supply upon an increase in pressure therein to a chosen degree which is less than supplied by said supply means.

5. In a vehicle brake system, in combination, means having a plurality of chambers, valve means operative in accordance with variations in fluid pressure in said chambers for controlling the degree of brake application on the vehicle, supply means for supplying fluid under pressure to each of said chambers through a separate communication, pressure limiting means for supplying fluid from said supply means at a pressure which is less than supplied by said supply means, and means controlled by a variable operating condition of the vehicle and operative upon a series of successive changes in such condition to close first one and then another of said communications and at the same time to successively connect the chambers thus cut off from said supply means to said pressure limiting means for rendering said pressure limiting means operative to control the pressure therein.

6. In a vehicle brake system, in combination, means having a plurality of chambers, valve means operative in accordance with variations in fluid pressure in said chambers for controlling the degree of brake application on the vehicle, supply means for supplying fluid under pressure to each of said chambers through a separate communication, pressure limiting means for supplying fluid from said supply means at a pressure which is less than supplied by said supply means, and valve means controlled by a variable operating condition of the vehicle and operative in accordance with different changes in said operating condition to close one or more of said communications and to connect the chamber or chambers thus cut off from said supply means to said pressure limiting means for rendering said pressure limiting means operative to control the pressure therein.

7. In a vehicle brake system, in combination, means having a plurality of chambers, valve means operative in accordance with variations in pressure in said chambers for controlling the degree of brake application on the vehicle, supply means for supplying fluid under pressure to each of said chambers through a separate communication, a pressure limiting device operative upon the supply of fluid under pressure by said supply means to supply fluid under pressure to a secondary chamber and to release fluid under pressure therefrom for providing therein a substantially constant pressure, and means controlled by a variable operating condition of the vehicle controlling said communications and operative in accordance with different changes in said operating condition to close one or more of said communications and to connect the chamber or chambers thus cut off from said supply means to said secondary chamber whereby said pressure limiting means is rendered effective to limit the pressures therein.

8. In a vehicle brake system, in combination, a pair of cooperatively arranged movable abutments of different effective areas adapted to be operated by fluid under pressure to effect an application of the brakes, supply means for supplying fluid under pressure to both of said abutments for actuating same, and means operative to limit the pressure of fluid supplied to actuate the larger of the two abutments to a degree less than supplied by said supply means.

9. In a vehicle brake system, in combination, a pair of cooperatively arranged movable abutments of different effective areas adapted to be operated by fluid under pressure to effect an application of the brakes, supply means for supplying fluid under pressure to both of said abutments for actuating same, pressure limiting means for supplying fluid from said supply means at a pressure which is less than supplied by said supply means, and a valve device controlled by a variable operating condition of the vehicle controlling communication through which fluid is adapted to be supplied from said supply means to the abutment of greater area and operative upon a change in such condition to close said communication and to connect said abutment of greater area to said pressure limiting means for control by the pressure of fluid supplied by said pressure limiting means.

10. In a vehicle brake system, in combination, a pair of cooperatively arranged movable abutments of different effective areas adapted to be operated by fluid under pressure to effect an application of the brakes, supply means for supplying fluid under pressure to both of said abutments for actuating same, means operative upon the supply of fluid under pressure by said supply means to supply fluid under pressure to and to release fluid under pressure from a chamber for providing a substantially constant pressure therein, and means controlled by a variable operating condition of the vehicle and operative upon a change in such condition to close communication between said supply means and the abutment of larger area and to connect said abutment of larger area to said chamber for control by the fluid pressure therein.

11. In a vehicle brake system, in combination, a plurality of cooperatively arranged movable abutments of different effective areas, valve means adapted to be operated by said abutments to apply the brakes on the vehicle to a degree dependent upon the pressure of fluid acting on said abutments, supply means to which fluid under pressure is supplied for actuating said abutments, pressure limiting means operative upon the supply of fluid under pressure to said supply means to supply fluid to a chamber at a pressure which is less than in said supply means, means controlled by a variable operating condition of the vehicle controlling the supply of fluid under pressure from said supply means to said abutments and operative in accordance with various changes in said operating condition to selectively close communication between said supply means and one or more of said abutments and to connect the abutment of greatest effective area to said chamber for control by the fluid pressure therein.

12. In a vehicle brake system, in combination, a secondary control pipe, a pair of movable abutments of different effective areas, valve means controlled by the pressure of fluid acting on said abutments for providing a proportional pressure in said secondary control pipe for applying the brakes on the vehicle, a primary control pipe to which fluid under pressure is adapted to be supplied for controlling the operation of said abutments, the outer face of the larger of said abutments being subject to pressure of fluid in said secondary control pipe and the opposite face of the other abutment being connected to said primary control pipe, means operative upon the supply of fluid under pressure to said primary control pipe to supply fluid to a chamber at a pressure which is less than in said primary control pipe, and means controlled by a variable operating condition of the vehicle operative at one time to establish communication between the primary control pipe and the adjacent faces of the two abutments and at another time to close said communication and to establish a communication between said chamber and the adjacent faces of the two abutments.

13. In a vehicle brake system, in combination, a secondary control pipe, a pair of movable abutments of different effective areas, valve means controlled by the pressure of fluid acting on said abutments for providing a proportional pressure in said secondary control pipe for applying the brakes on the vehicle, a primary control pipe to which fluid under pressure is adapted to be supplied for controlling the operation of said abutments, the outer face of the larger of said abutments being subject to pressure of fluid in said secondary control pipe and the opposite face of the other abutment being connected to said primary control pipe, said abutments co-operating to form a pressure chamber intermediate thereof, limiting valve means operative upon the supply of fluid under pressure to said primary control pipe to supply fluid under pressure to and to release fluid under pressure from another chamber, a spring, a movable abutment controlled by the opposing pressures of said spring and the pressure of fluid in said other chamber for controlling the operation of said limiting valve means to provide a limited pressure in said other chamber which is less than in said primary control pipe, and means operative under one operating condition of the vehicle to connect the chamber intermediate said abutments to said primary control pipe and under another operating condition to connect the intermediate chamber to said other chamber.

14. In a vehicle brake system, in combination, a primary control pipe, a secondary control pipe, valve means operative to supply fluid under pressure to and to release fluid under pressure from said secondary control pipe, a pair of flexible diaphragms having different effective areas and operatively associated with said valve means for controlling the operation thereof, said diaphragm being subject on their adjacent faces to the pressure of fluid in an intermediate chamber normally open to said primary control pipe, one of said diaphragms being subject on its opposite face to the pressure of fluid in said secondary control pipe and the other diaphragm being subject on its opposite face to the pressure of fluid in a chamber which is open to said primary control pipe, means for supplying fluid under pressure through said primary control pipe to both of said chambers for effecting operation of said valve means to supply fluid under pressure to said secondary control pipe, a valve controlling communication between said primary control pipe and the chamber formed intermediate said diaphragms, means responsive to a certain operating condition of the vehicle for operating said valve to open said communication and to a different operating condition of the vehicle to operate said valve to close said communication and to connect said intermediate chamber to a release passage for releasing fluid under pressure therefrom, a spring, and valve means controlled by opposing pressures of fluid in said release passage and said spring and operative to either supply fluid under pressure from said primary control pipe to said release passage or for releasing fluid under pressure from said release passage to maintain a chosen degree of pressure in said release passage which is less than in said primary control pipe.

15. In a vehicle brake system, in combination, a primary control pipe, a secondary control pipe, valve means operative to supply fluid under pressure to and to release fluid under pressure from said secondary control pipe, a stack of cooperatively arranged, flexible diaphragms of successively decreasing effective areas operatively connected to said valve means for controlling the operation thereof, the stack being arranged with the outer face of the largest diaphragm subject to pressure in said secondary control pipe and the opposite face of the smallest diaphragm subject to the pressure of fluid in said primary control pipe, there being provided between each adjacent pair of said diaphragms an intermediate chamber, means controlled by a variable operating condition of the vehicle for controlling communication between the several intermediate chambers and said primary control pipe and operative at one time to connect all of said intermediate chambers to said primary control pipe and operative at other times to disconnect one or more of said intermediate chambers from said primary control pipe and to connect same to a release communication, and a pressure limiting device operative upon the supply of fluid under pressure to said primary control pipe to supply fluid to said release passage at a chosen pressure which is less than in said primary control pipe and operative upon an increase in pressure in said release passage to a degree greater than said chosen pressure to release fluid under pressure therefrom.

16. In a control device for a fluid pressure brake system, in combination, a stack of cooperating unconnected movable abutments of different effective areas arranged in coaxial spaced relation and adapted to move collectively as a unit, means for supplying fluid under pressure to the spaces intermediate said abutments and to the space at the outer face of one of the end abutments of said stack for effecting movement of said stack out of a normal position, means for selectively varying the degree of fluid pressure acting in said intermediate spaces, valve means controlled by movement of said abutments and connected to the abutment at the opposite end of said stack for movement therewith, and a spring acting on the first named end abutment for urging all of said abutments in the direction of the last named end abutment to maintain all of said abutments in operating contact.

17. In a control device for a fluid pressure brake system, in combination, a stack of cooperating unconnected movable abutments of different effective areas arranged in coaxial spaced relation and adapted to move collectively as a unit, means for supplying fluid under pressure to the spaces intermediate said abutments and to the space at the outer face of one of the end abutments of said stack for effecting movement of said stack out of a normal position, means for selectively varying the degree of fluid pressure acting in said intermediate spaces, valve means controlled by movement of said abutments and connected to the abutment at the opposite end of said stack for movement therewith, a spring acting on one end of said stack for biasing said abutments to their normal position, and a spring acting on the opposite end of said stack and cooperating with the first named spring for maintaining said abutments in operating contact.

ELLIS E. HEWITT.